US006983294B2

(12) United States Patent
Jones et al.

(10) Patent No.: US 6,983,294 B2
(45) Date of Patent: Jan. 3, 2006

(54) REDUNDANCY SYSTEMS AND METHODS IN COMMUNICATIONS SYSTEMS

(75) Inventors: David Joseph Jones, Ottawa (CA); Douglas Heath Patriarche, Ottawa (CA)

(73) Assignee: Tropic Networks Inc., Kanata (CA)

( * ) Notice: Subject to any disclaimer, the term of this patent is extended or adjusted under 35 U.S.C. 154(b) by 200 days.

(21) Appl. No.: 10/120,435

(22) Filed: Apr. 12, 2002

(65) Prior Publication Data
US 2002/0169794 A1 Nov. 14, 2002

Related U.S. Application Data

(60) Provisional application No. 60/289,545, filed on May 9, 2001.

(51) Int. Cl.
*G06F 17/30* (2006.01)
(52) U.S. Cl. .................................... 707/202
(58) Field of Classification Search ............... 707/202, 707/201, 9, 8, 200
See application file for complete search history.

(56) References Cited

U.S. PATENT DOCUMENTS 5,485,608 A * 1/1996 Lomet et al. ............... 707/202
5,625,817 A * 4/1997 Wood et al. ................ 707/101
6,253,209 B1 * 6/2001 Chase-Salerno et al. . 707/104.1
6,671,699 B1 * 12/2003 Black et al. ................ 707/201
6,671,705 B1 * 12/2003 Duprey et al. .............. 707/204

OTHER PUBLICATIONS

Lee et al., Physical Layer Redundancy Method for Fault-Tolerant Networks, Factory Communication Systems, 2000. Proceddings IEEE International Workshop on, Sep. 6-8, 2000, pp. 157-163.*
Peter Morrissey; IP Routing Primer: Part Four; Network Design Manual, OSPF Version 2; Nov. 27, 2000; pp 1 to5. <http://networkcomputing.com/netdesign/iprpart4.html>.

* cited by examiner

*Primary Examiner*—Greta Robinson
(74) *Attorney, Agent, or Firm*—Victoria Donnelly

(57) ABSTRACT

A method and apparatus are provided for improving redundancy and load sharing in control cards in the control plane of a communication node. An active control card which receives a request passes the request to the inactive control card for processing if and only if the inactive control card is synchronized with the active control card and the inactive control card is able to process the request. Redundancy and load sharing are further improved if the active control card separates the processing of managing the request and the determination of a response to the request onto separate processors on the control card. In one embodiment, the control cards are OSPF modules in a router. Redundancy is effected by more accurately synchronizing the link state database of each OSPF module, and by allowing the state of each neighboring router to be determined only by the active OSPF module and not independently by any inactive OSPF module.

28 Claims, 5 Drawing Sheets

REDUNDANCY SYSTEMS AND METHODS IN COMMUNICATIONS SYSTEMS

RELATED APPLICATION

This application claims the benefit of U.S. provisional application No. 60/289,545 filed May 9, 2001.

FIELD OF THE INVENTION

This invention relates to redundancy in communication systems.

BACKGROUND OF THE INVENTION

Redundancy is used in fault tolerant systems to deal with failures. When a primary component (either hardware or software) fails, a back-up component takes over the responsibilities of the primary component.

An important place where redundancy may be used is the control plane of a communication system. The control plane is responsible for monitoring events in and the status of the network, and may be responsible for monitoring service level agreements. Typically a network node has a primary control card implementing the node's control plane responsibilities. A primary control card of the network node receives requests, and retrieves any system information necessary for responding to the requests. The system information may be stored locally in a database of the control card, or may be retrieved from other components of the communication system through line interface cards. For example, a control card could receive a request for usage statistics of a line card in order to monitor service level agreements. The control card may need to poll the line cards frequently in order to respond to frequent requests for statistics.

Such systems usually include a redundant control card for each primary control card in order to provide redundancy in the event of failure of the primary control card. The redundant control card must be able to assume the responsibilities of a failed primary control card almost instantly. The primary control card and the redundant control card should also be synchronized, in that they should have access to the same system information. Both of these issues are particularly important in the control plane of communication systems, in which large amounts of system information are changing quickly, and in which the responsibilities of a failed primary control card must be assumed by the redundant control card quickly in order to deal with high volumes of traffic and high quality of service expectations.

There are two common types of redundancy that attempt to achieve synchronicity and rapid assumption of responsibilities. The first type of redundancy is hot redundancy (also called 1:1 redundancy or lock-step redundancy). In systems employing hot redundancy, completely redundant hardware and software components are used. The redundant components are used solely as back-up components, in that they do nothing during normal operation of the system. The primary component is active, and the redundant component remains inactive in the sense that it has no effect on system operation. However, the redundant component operates exactly like the active component, making exactly the same computations and updating system information. Only when a primary component fails does a redundant component become active in the sense that it actually effects the system. Hardware circuits are typically used to ensure extremely fast activity switches. Synchronicity is achieved by use of point to point communication channels to ensure that the system information accessible by the primary component is the same as the system information accessible by the redundant component.

In communication systems, hot redundancy is frequently used in voice communication systems due to the high reliability requirements. However, while hot redundancy ensures that the redundant component is always available in case of failure of the primary component, the inclusion of completely inactive redundant components is expensive. Components are doubled in number, without doubling capacity of the system in which the components are installed. The capacity of the redundant component is unused, other than to maintain synchronicity of system information with the primary component, until a failure occurs. This unused capacity is a potentially valuable resource in data communication systems.

The second type of redundancy is load sharing. In systems employing load sharing, the secondary component is used to some extent in normal operation. The use of an otherwise inactive component increases the efficiency of the system. When a failure occurs in the primary component, the redundant component takes on the added responsibility of the primary component, in addition to the tasks already being processed by the redundant component.

The secondary component does not stay in lock-step with the primary component and therefore when a load sharing redundancy system fails, it takes longer for the redundant component to assume all the responsibilities of the primary component. Also, such systems typically do have certain single point of failure scenarios which the redundancy scheme cannot handle. The occurrence of such a failure can be catastrophic.

In data communications, rather than having redundancies within each node, the emphasis has been on redundant nodes within the network and the ability to re-route around a failure.

Redundancy is used to ensure that routing information can be provided upon demand. Two responsibilities of a router employing the Open Shortest Path First (OSPF) protocol are to maintain a link state database describing a topology of the communication network, and to provide routes upon request using the stored topology of the communication network.

OSPF Routers exchange link state information in the form of Link State Advertisements (LSAs). A router floods the communication network with LSAs when the router first comes online, and typically periodically thereafter. An OSPF router also transmits an LSA if it detects a change in the network topology, for example if a neighbouring router goes down. Each OSPF router maintains a state machine for each neighbouring router. If the state of a neighbouring router is "Full", then the router on which the OSPF module resides is in full communication with the neighbouring router. If the OSPF router does not receive a "Hello" packet from a neighbouring router before the expiry of a timer, then the state of the neighbouring router is set to "Down". The state of the neighbouring router progresses through various states until a proper exchange of protocol packets is completed, at which time the state of the neighbouring router is set to "Full". While the state of a given neighbouring router is not "Full", the OSPF router does not attempt to calculate routes through the neighbouring router.

Any redundancy system within an OSPF router should ensure that an active OSPF module is synchronized with a standby OSPF module so that each OSPF module is capable of calculating routes using the same stored network topology, and will therefore calculate the same shortest path when requested. The link state database of each OSPF module would therefore have to be synchronized properly. Lack of synchronicity could arise due to delay in processing or copying LSA information from one OSPF module to another. However, general redundancy schemes involve byte-wise copying of redundancy information from an active control card to a standby control card. This could create problems in an OSPF router, since the standby OSPF module could contain meaningless (or at best, confusing) data if asked to calculate a route part way through copying of an LSA.

Additionally, the wasted capacity of hot redundancy is a particular problem in routers, since calculation of a shortest path is computationally very expensive.

SUMMARY OF THE INVENTION

One broad aspect of the invention provides a redundancy method of managing requests in a control plane of a communication node, the communication node including a first control card and a second control card. The redundancy method involves defining one of the control cards to be in an active state and the other of the control cards to be in an inactive state, the control card in the inactive state having a reduced set of privileges compared to the control card in the active state; maintaining synchronicity of information stored on the control card in the active state and the control card in the inactive state such that the control card in the inactive state can assume responsibilities of the control card in the active state in case of failure of the control card in the active state; monitoring for failure of the control card in the active state, and upon determining that a failure of the control card in the active state has occurred switching states of the control card in the inactive state and the control card in the active state such that the control card in the inactive state has the active state and the control card in the active state has the inactive state; receiving or generating a request at the control card in the active state; determining whether the request is to be passed to the control card in the inactive state; and if the request is to be passed to the control card in the inactive state, passing the request to the control card in the inactive state.

In some embodiments, switching states of the control card in the inactive state and the control card in the active state involves resetting the control card in the active state and sending a signal to the control card in the inactive state indicating that the control card in the inactive state is to assume responsibilities of the control card in the active state.

In some embodiments, monitoring for a failure of the control card in the active state comprises monitoring a reliability measure of each control card, and determining that a failure of the control card in the active state has occurred if the reliability measure of the control card in the active state relative to that of the control card in the inactive state indicates that the control card in the active state is less reliable than the control card in the inactive state.

In some embodiments, monitoring a reliability measure of each control card comprises maintaining a demerit count for each control card indicating how many of at least one monitored component of the control card are in an unreliable state; if the demerit count of the control card in the active state lies above the demerit count of the control card in the inactive state, determining that a failure of the control card in the active state has occurred.

In some embodiments, determining whether the request is to be passed to the control card in the inactive state involves determining whether the control card in the inactive state is synchronized with the control card in the active state; determining if the request has a type which is designated to be processable by the control card in the inactive state; determining the request is to be passed to the control card in the inactive state if the control card in the inactive state is synchronized with the control card in the active state and the request has a type which is designated to be processable by the control card in the inactive state.

In some embodiments, the control card in the inactive state includes at least one request provider, and passing the request to the control card in the inactive state involves selecting a selected request provider at the control card in the inactive state; and passing the request to the selected request provider.

In some embodiments, the method allows for requests to be received at the control card in the inactive state. The method further involves determining whether the request is one which is allowed to be processed on the control card in the inactive state; if the request is one which is allowed to be processed on the control card in the inactive state, passing the request to a request provider on the control card in the inactive state.

In some embodiments, the method further involves, if the request is one which is not allowed to be processed on the control card in the inactive state, determining whether the request is to be passed to the control card in the active state by determining whether the control card in the inactive state is synchronized with the control card in the active state and determining whether active handoff of the request is allowed; and if active handoff of the request is allowed and the control cards are synchronized, passing the request received at the inactive card to a request provider on the control card in the active state.

In some embodiments, the method further involves rejecting the request if the control card in the inactive state is not synchronized with the control card in the active state, the request can not be processed by the control card in the inactive state, and if active handoff of the request is not allowed.

In some embodiments, the communication node is a router running link state routing protocols, wherein the control card in the active state and the control card in the inactive state each include a respective link state database, and wherein maintaining synchronicity involves upon activation of the router, copying the link state database of the control card in the active state to the link state database of the control card in the inactive state as a series of atomic information units; and upon receipt of a new atomic information unit by the control card in the active state, sending a copy of the new atomic information unit to the control card in the inactive state. The atomic information units might for example be Link State Advertisements.

In some embodiments, the control card in the active state and the control card in the inactive state each maintain a state machine for each of at least one neighbouring router, and the method further involves receiving protocol packets from the at least one neighbouring router; passing the protocol packets to both the control card in the active state and the control card in the inactive state; the control card in the active state running its state machine as a function of the protocol packets; the control card in the active state sending instructions to the control card in the inactive state; and the control card in the inactive state running its state machine as a function of the protocol packets and the instructions received from the control card in the active state.

In some embodiments, the control card in the active state sending instructions to the control card in the inactive state involves upon occurrence of a particular state transition of the control card in the active state's state machine the control card in the active state sending a notification of the particular state transition to the control card in the inactive state. The control card in the inactive state running its state machine involves the control card in the inactive state running its state machine as a function of the protocol packets excepting that any state transition of the control card in the inactive state's state machine corresponding to one of the particular state transitions of the control card in the active state's state machine is only implemented upon receipt of the notification of the particular state transition.

In some embodiments, the protocol packets are Open Shortest Path First (OSPF) protocol packets, and in some embodiments, the particular state transition is any transition out of "Full".

Another broad aspect of the invention provides a redundancy system comprising two control cards adapted to implement any of the above summarized redundancy methods.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
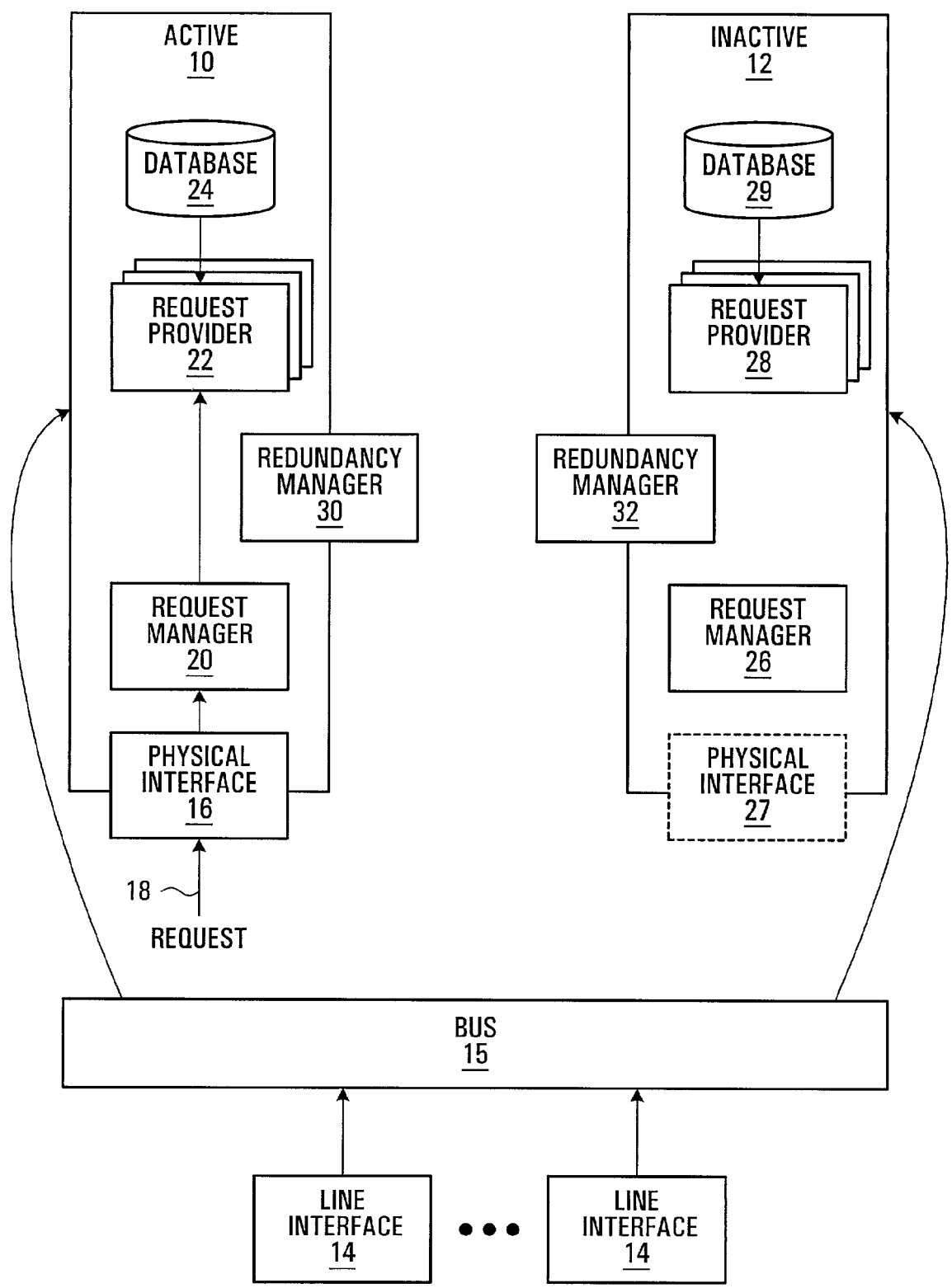
FIG. 1 is a block diagram of a redundancy system according to one embodiment of the invention.

Referring to FIG. 1, a redundancy system according to one embodiment of the invention is shown. The redundancy system include two identical control cards 10,12. One control card 10 is shown in an active state, hereinafter referred to as the active (or primary) control card (ACC), and the other control card 12 is shown in an inactive state, hereinafter referred to as the inactive (or redundant) control card (ICC) 12. Each of the control cards 10 and 12 communicate with a plurality of line interface cards 14 via a bus 15. The control cards 10 and 12 and the line interface cards 14 are typically located within a shelf of a communications node, such as a metro optical node, within a communication system.

The ACC 10 includes a physical interface 16, such as an Ethernet port. The ACC 10 has a number of components typically connected to each other through a bus on the card with most components being individually addressable. Typically, an operating system is included which provides a message passing mechanism. For example, messages may have a source and destination, each specifying a shelf, slot and processor number. All components in the system are connected by the system bus 15. These include a request manager 20, a plurality of request providers 22, a database 24 containing stored system information, and a redundancy manager 30. The ACC 10 receives requests 18 from a requesting application, for example a network management terminal (not shown), through the physical interface 16. Each request may be any one of thousands of types of requests received by a control plane of the communication system. The request may be in any suitable format, SNMP, telnet, or HTTP, to name a few examples. For example, the request may be a request for usage statistics of one of the line interface cards 14 or may be a request for information in the database 24.

In typical implementations, most requests originate within the node itself, many within the ACC. There is no restriction on where requesting entities may reside, only that their requests are first sent to the request manager on the ACC.

Each request 18 is passed to the request manager 20 within the ACC 10. Each of the plurality of request providers 22 is a subsystem that can process one or more types of request. The request providers 22 have access to the database 24 of stored system information, and to the line interface cards 14 via the bus 15. In normal operation (that is, until a failure occurs), when the request manager 20 receives a request 18 the request manager 20 selects a selected request provider from the plurality of request providers 22 based on which request provider can process the request 18. The request manager 20 passes the request 18 to the selected request provider. The selected request provider accesses system information necessary to respond to the request 18, either from the database 24, a line interface card 14, or both. The selected request provider determines a response to the request 18 using the retrieved system information. The selected request provider passes the response to the request manager 20, which in turn passes the response to the requesting application through the physical interface 16.

The inactive control card 12 is identical to the active control card 10 as it must be able to take over from the active control card 10. Thus, the ICC 12 includes a plurality of request providers 28, redundancy manager 32, and a database 29 of stored system information. There is also a request manager 26 and a physical interface 27, but these are inactive until the inactive control card 12 takes on the role of the active control card 10 after a failure. The components of the inactive control card 12 are also individually addressable. Components on the active control card 10 and the inactive control card 12 can communicate with each other over the bus 15 using this individual addressability.

Although the inactive control card 12 and the active control card 10 have identical components and subsystems, they perform differently. The inactive control card 12 has a reduced set of privileges, in that the inactive control card 12 can only process a limited subset of all possible types of request. This reduced set of privileges may for example involve each request manager 20 and 26 maintaining a table of commands that can be processed by the communication node. The table identifies whether each command can be processed by the inactive control card 12. Only the control card in the active state is allowed to generate requests.

The redundancy managers 30 and 32 are responsible for synchronizing the two control cards. Synchronization of the control cards requires that the database 24 on the ACC 10 and the database 29 on the ICC 12 contain the same system information by copying all changes to the active control card's database 24 to the inactive control card's database 29. The redundancy managers 30, 32 keep the two cards very close to being in "hot redundancy". The two databases 24, 29 are kept completely in sync. Information concerning the line interface cards 14 is kept on the line interface cards 14 and does not need to be replicated. Typically everything is replicated except for some RAM which is regenerated in the "inactive" card after a switch. More particularly, at least all information that cannot be derived from the transferred information should be replicated on the ICC 12. Information which can be derived from previously transferred information does not need to be transferred. For example, a network topology is replicated from the ACC 10 to the ICC 12, but best routes are not replicated since the ICC 12 can derive the best routes from the replicated topology information.

When the ICC 12 is switched on, the redundancy managers 30 and 32 transfer system information from the ACC 10 to the ICC 12. Once all system information to be transferred has been transferred (i.e. other than information derivable by the ICC 12), the ACC 10 declares the ICC 12 to be in sync. The ICC 12 can fall out of sync with the ACC 10 if system information on the ACC 10 is changing faster than it can be replicated to the ICC 12. The ACC 10 has a fixed size information buffer which stores information to be replicated. If the buffer fills because the ICC 12 is not draining information from the buffer quickly enough, the ACC 10 declares the ICC 12 out of sync. The redundancy managers 30 and 32 then restart synchronization of the ACC 10 and the ICC 12, as if the ICC 12 had been switched on again.

The redundancy managers on the ACC 10 and ICC 12 monitor the state of the ACC 10. If the ACC 10 fails (for example, a process resets or some other hardware fault occurs), the ACC 10 is reset and the ICC 12 immediately receives a hardware interrupt (more generally some sort of signal) indicating that the ICC 12 is to assume the responsibilities of the ACC 10. Simultaneously, the physical interface 16 begins communicating with the request manager 26 on the ICC 12 rather than the request manager 20 on the ACC 10, so that the switch from ACC 10 to ICC 12 is not carried out by or even perceived by any external management system.

In one embodiment, the redundancy managers monitor a reliability measure of each control card. If the reliability measure of the ACC 10 falls below the reliability measure of the ICC 12, the redundancy managers determine that a failure has occurred in the ACC 10. This allows proactive prevention of faults. (This assumes that the reliability measures are defined such that a higher reliability measure signifies a higher reliability of the respective control card. If a higher reliability measure signifies a lower reliability of the respective control card, then the redundancy managers act as if a failure has occurred in the ACC 10 if the reliability measure of the ACC 10 rises above that of the ICC 12.)

As one example of a reliability measure, the ACC 10 and the ICC 12 each monitor at least one monitored component (each of which may be a software component or a hardware component). Each monitored component is in either a reliable state or an unreliable state. When a monitored component changes state, each of the ACC 10 and the ICC 12 determine a demerit count. The demerit count is a count (possibly weighted) of the number of monitored components currently in the unreliable state. The hardware circuit compares the demerit count of the ACC 10 with that of the ICC 12 to determine which control card is "healthier". If the hardware circuit determines that the ICC 12 is healthier than the ACC 10 because the ICC 12 has a lower demerit count than does the ACC 10, the hardware circuit resets the ACC 10 and the ICC 12 immediately assumes the responsibilities of the ACC 10. It can be seen that a "failure" of the ACC does not necessarily mean that it is completely non functional, only that a decision that it has decreased reliability.

Load sharing is achieved by allowing the request manager 20 on the ACC 10 to pass requests to the request providers 28 on the ICC 12. Since the request providers 22, 28 on both control cards can access the line interface cards 14, the control bandwidth between the combination of the active control card 10 and the inactive control card 12 and the line interface cards is double that of a single control card. This is an important improvement since control plane messaging in communication systems is frequently bottlenecked by communication between the control cards and the line interface cards. Typically external systems monitor service level agreements (SLAs) by very aggressive querying of statistics on the line interface cards 14. Doubling the control bandwidth reduces the bottleneck between the control cards and the line interface cards in responding to these queries. Examples of statistics that might be requested at high frequency include a number of transmit packets sent, number of transmit or receive packets shipped, SLA statistics for service path through the node, node inventory requests, verification that particular hardware exists in the node, checking software loads on the cards, retrieving manufacturing information from the cards, and retrieving card and port status information.

Figure 2:
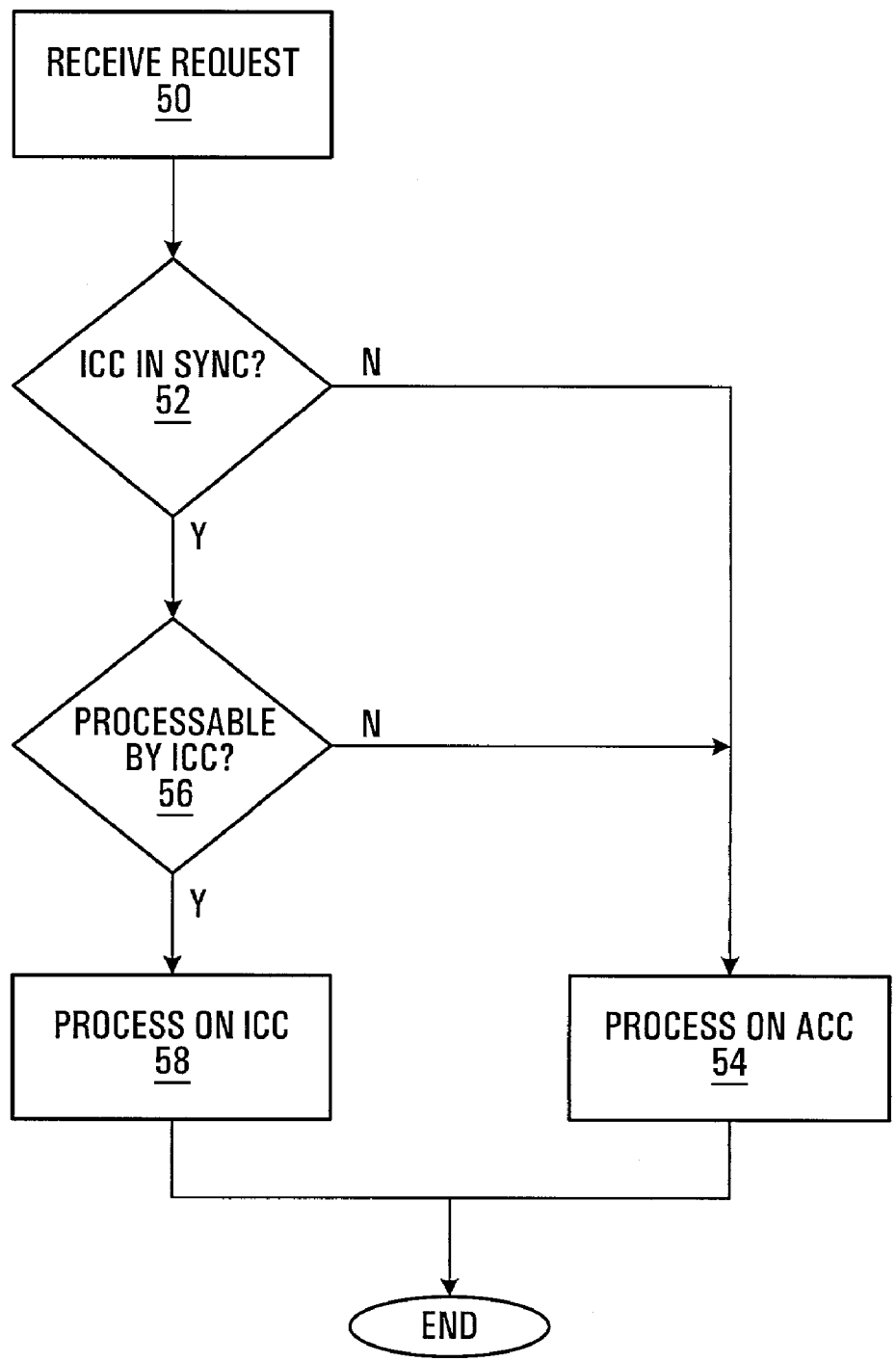
FIG. 2 is a flowchart of a method by which the resource manager of the active card of FIG. 1 manages a request according to one embodiment of the invention.

The request manager 20 only passes a request to a request provider on the ICC 12 if the request manager 20 determines that the ICC 12 is synchronized with the ACC 10 and that the request can be processed by the ICC 12. Otherwise, the request manager 20 passes the request to a request provider on the ACC 10. Referring to FIG. 2, a method by which the resource manager 20 of FIG. 1 manages a request according to one embodiment of the invention is shown. The method is executed by the resource manager 20 of the ACC 10. At step 50 the resource manager 20 receives a request. At step 52 the resource manager 20 determines whether the ICC 12 is synchronized with the ACC 10. If the ICC 12 is not synchronized with the ACC 10, then at step 54 the resource manager 20 selects a selected resource provider on the ACC 10 and passes the request to the selected resource provider.

If at step 52 the resource manager 20 determines that the ICC 12 is synchronized with the ACC 10, then at step 56 the resource manager 20 determines whether the request is of a type that can be processed by the ICC 12 by consulting the table of commands that can be processed by the node. If this is the case, then at step 58 the resource manager passes the request to the selected request provider of the ICC 12. Otherwise, the request manager passes the request to the selected request provider of the ACC 10 at step 54.

The embodiment of FIG. 1 provides the benefits of the hot redundancy schemes since the inactive card is kept fully up to date and can take over immediately from the active card upon a failure. When this occurs, the roles of the active and inactive control cards are reversed, with the request manager 26 and physical interface 27 on the previously inactive control card 12 becoming active. It also provides the benefits of a load sharing system in that in the absence of a failure, the capacity of the control cards to handle requests is effectively doubled.

Unlike existing systems which are really only suitable for data or voice but not both, the redundancy scheme described herein is suitable for both voice and data applications.

Figure 3:
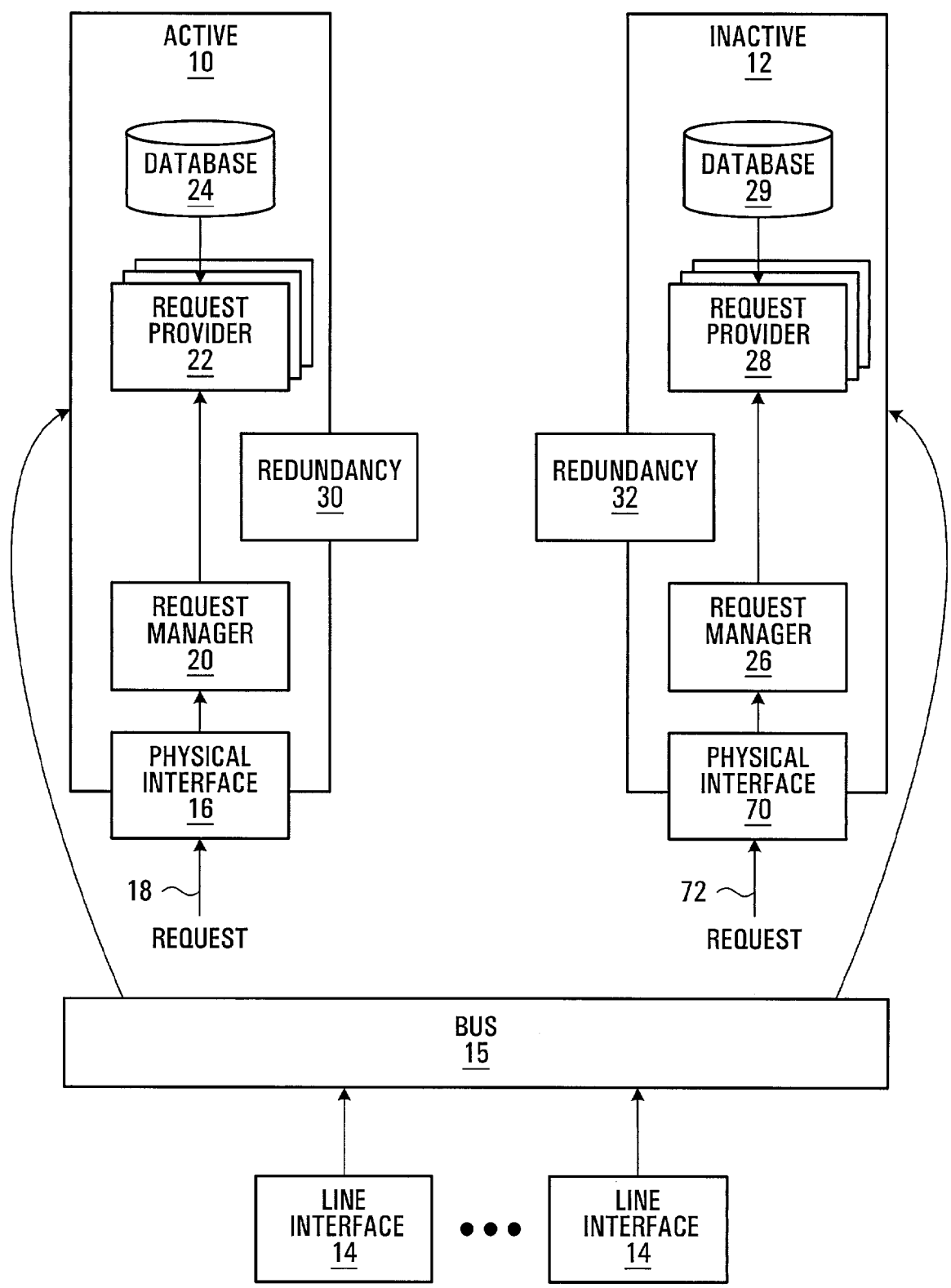
FIG. 3 is a block diagram of a redundancy system according to another embodiment of the invention.

Referring to FIG. 3, a redundancy system according to another embodiment of the invention is shown. The ACC 10 in this embodiment is similar to the ACC 10 described above with reference to FIG. 1. However, the ICC 12 includes an active physical interface 70, making the redundancy system a dual interface redundancy system. Additionally, the resource manager 26 is used even while in the inactive state, and communicates with the physical interface 70, the request providers 28 on the ICC 12, and the request providers 22 on the ACC 10. Such an ICC may be referred to as a receiving ICC, as it can receive requests independently of the ACC. The ICC 12 may receive a request 72 through the physical interface 70. The request 72 is passed to the request manager 26, which determines whether the request can be processed by the ICC 12, as described below with reference to FIG. 4. If the request can be processed by the ICC 12, the request manager 26 selects a selected request provider from the plurality of request providers 28, and passes the request to the selected request provider. Since both physical interfaces are active, this embodiment has twice the request bandwidth compared to that of the embodiment of FIG. 1.

Figure 4:
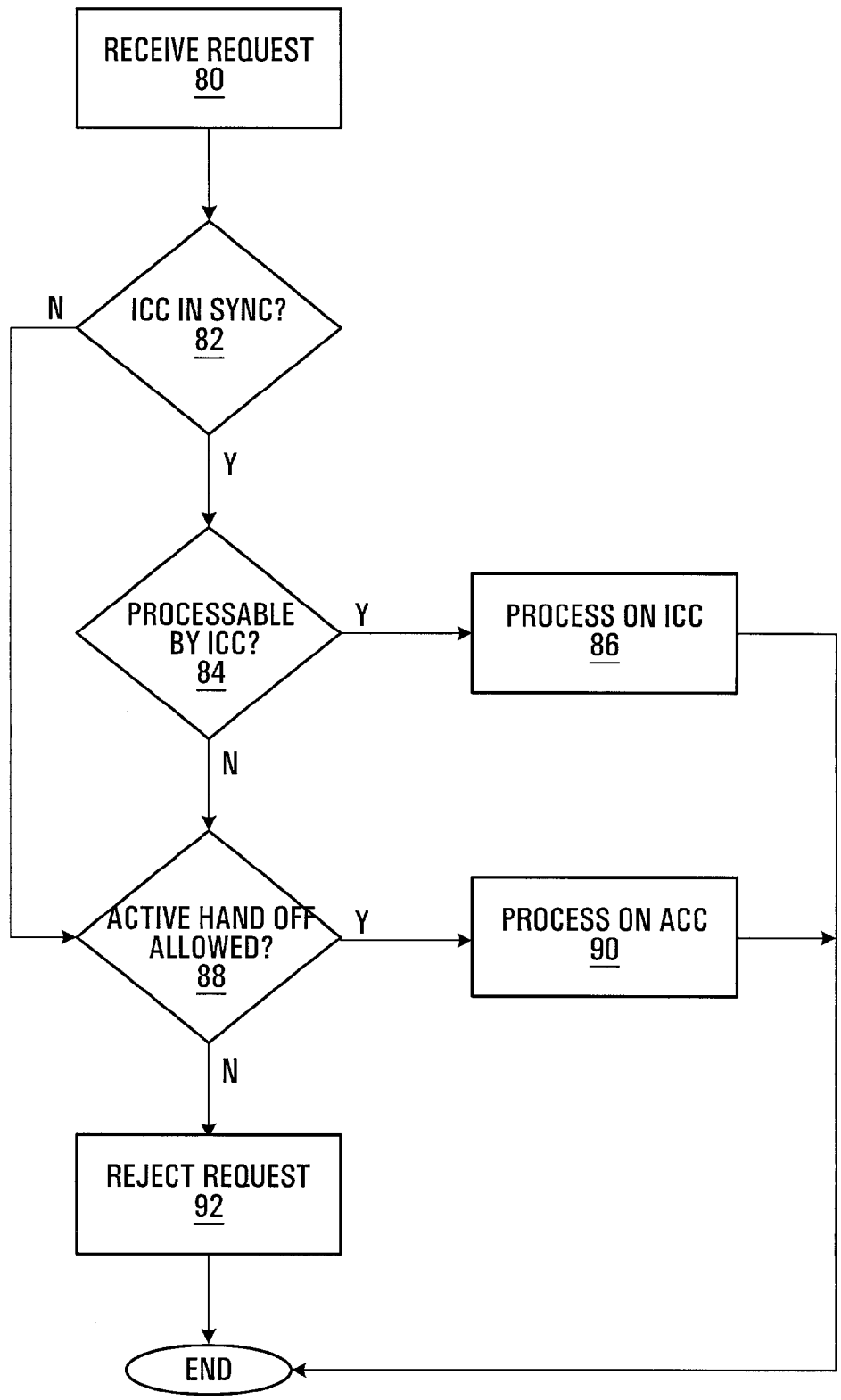
FIG. 4 is a flowchart of a method by which the resource manager of the inactive card of FIG. 3 manages a request according to one embodiment of the invention.

The request manager 26 only passes requests to a resource provider on the ICC 12 if the resource manager 26 determines that the ICC 12 is synchronized with the ACC 10 and that the request can be processed on the ICC 12. Otherwise, the request manager 26 determines if active handoff of the request is allowed. If active handoff of the request is allowed, then the request manager 26 passes the request to a request provider on the ACC 10. If active handoff of the request is not allowed, then the request manager 26 rejects the request. Referring to FIG. 4, a method by which the request manager 26 of FIG. 3 manages a request according to one embodiment of the invention is shown. The request manager 26 receives a request through the physical interface 70 at step 80. At step 82 the request manager 26 determines whether the ICC 12 is synchronized with the ACC 10, which is possible since the ACC 10 will have declared the ICC 12 to be in sync or out of sync (as described above). If the request manager 26 determines that the two control cards are synchronized, then the request manager 26 determines at step 84 whether the request can be processed on the ICC 12 by consulting the table of commands (as described above). This determination is made in the same way that the request manager 20 of the ACC 10 makes this determination, as described above with reference to step 56 of FIG. 2. If the request manager 26 determines that the request can be processed on the ICC 12, then at step 86 the request manager 26 selects a selected request provider from the plurality of request providers 28 on the ICC 12 and passes the request to the selected request provider.

If the request manager 26 determines at step 82 that the two control cards are not synchronized or if the request manager 26 determines at step 84 that the request can not be processed on the ICC 12, then the request manager 26 determines whether passing of the request to the ACC 10 is allowed. At step 88 the request manager 26 determines whether active handoff of the request to the ACC 10 is allowed. If active handoff of the request to the ACC 10 is allowed, then at step 90 the request manager 26 selects a selected request provider from the plurality of request providers 22 on the ACC 10 and passes the request to the selected request provider. If active handoff of the request to the ACC 10 is not allowed then the request can be processed by neither the ICC 12 nor the ACC 10, and the request manager 26 rejects the request at step 92.

The invention will now be described with reference to a particular example, calculation and exchange of routing information in a control plane of a communication network employing the Open Shortest Path First protocol (J. Moy, "OSPF Version 2", IETF RFC 2178, July 1997, incorporated by reference herein). The OSPF protocol is a link-state routing protocol used for routing Internet Protocol traffic. The redundancy system shown in FIG. 1 (or FIG. 3) is installed at a router in the communication network. Each router includes at least two OSPF modules. One OSPF module is a primary (or active) OSPF module, and the remaining OSPF modules are redundant (or inactive) OSPF modules. In the description that follows, it is assumed that the router includes only one inactive OSPF module. The OSPF modules are request providers.

The primary (or active) OSPF module receives protocol packets such as routing updates in the form of Link State Advertisements (LSAs) and "Hello" packets, receives provisioning information indicating local characteristics, and receives requests for routing information (RRI) identifying a destination to which the router must determine a route. The active OSPF module stores a network topology of the communication network as a link state database in the database 24. When an LSA arrives at the router, the active OSPF module updates the link state database to reflect new status information about nodes and links identified in the LSA. When OSPF protocol packets arrive, appropriate changes are made to neighbour state machines (described below). When an RRI arrives from a requesting application, the active OSPF module extracts the destination contained in the RRI. The active OSPF module then calculates a shortest path to the destination using the link state database. The active OSPF module provides the shortest path to the requesting application.

Figure 5:
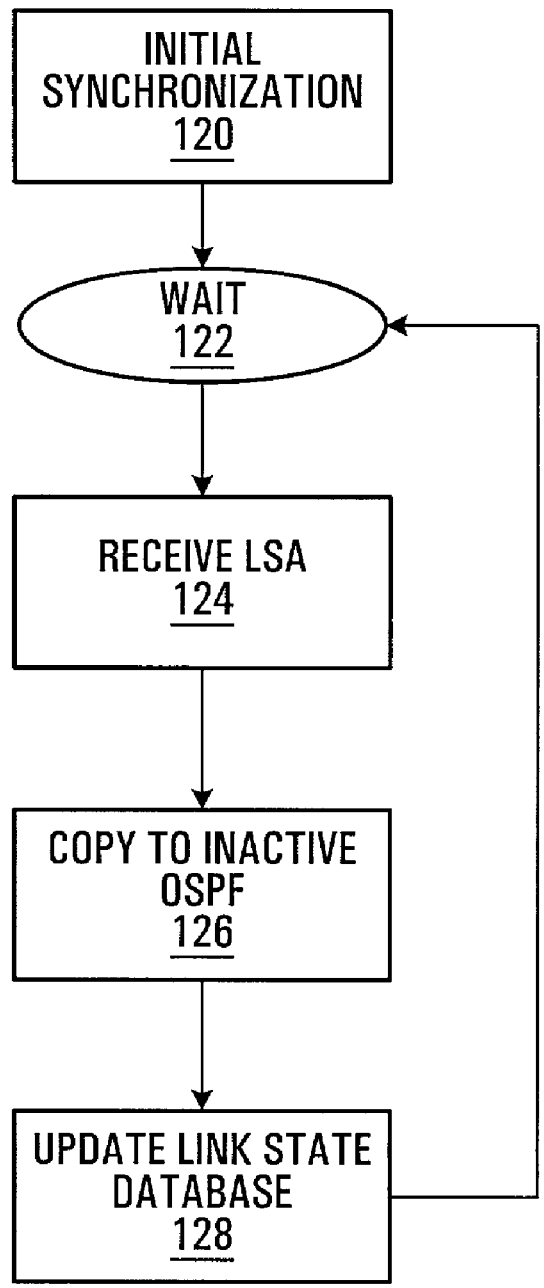
FIG. 5 is a flowchart of a method by which an active OSPF module initializes and maintains synchronicity of its link state database with that of an inactive OSPF module according to another embodiment of the invention.

Load sharing and redundancy with respect to RRIs is effected in the active OSPF module and the inactive OSPF module using the methods and apparatus described above with reference to FIGS. 1 to 4. In other words, routing requests can be handled by both the active and inactive OSPF modules. However, since each OSPF module consults the copy of the link state database in its respective database 24 or 29 in order to determine a shortest path, it is important that the link state databases in each database 24 and 29 be synchronized so that each OSPF will determine the same shortest path for a given RRI. Referring to FIG. 5, a method by which the active OSPF module initializes and maintains synchronicity of its link state database with that of the inactive OSPF module is shown. At step 120 the active OSPF module initializes synchronicity with the inactive OSPF module by copying its link state database to the inactive OSPF module. The link state base is copied as a series of LSAs, rather than byte-wise. LSAs are copied one at a time, including the checksum of the LSA, to the inactive OSPF module. This allows the inactive OSPF module to verify the accuracy of each LSA, and to build its copy of the link state database as it receives copies of individual LSAs. There will never be a "partial LSA" stored which could lead to junk computations.

More generally, the link state database may be copied as a series of any atomic information units, rather than byte-wise. These atomic information units are preferably LSAs in the case of an OSPF router but may be some other form of information, particularly for routers running link state routing protocols other than OSPF.

At step 122 the active OSPF module enters a Wait state. At some later time, the active OSPF module receives a new LSA at step 124. The active OSPF module passes a copy of the new LSA to the inactive OSPF module at step 126. At step 128 the active OSPF module updates its link state database using information within the new LSA. The active OSPF module then returns to a Wait state to await receipt of another new LSA.

Meanwhile, when the inactive OSPF module receives the copy of the new LSA sent by the active OSPF module at step 126, the inactive OSPF module updates its own link state database using information within the new LSA. Since both OSPF modules begin with the same link state database (as a result of step 120), receive the same new LSA (as a result of step 126), and implement the same updating algorithm, the link state database of each OSPF module will, aside possibly for a very brief time, be identical.

The very brief time during which the link state databases of the active OSPF module and the inactive OSPF module are not identical may arise due to message propagation delays between the active OSPF module and the inactive OSPF module. During this time, the shortest path calculated for a given RRI may differ depending on whether the RRI is sent to the active OSPF module or to the inactive OSPF module.

After the two link state databases are synchronized initially, from then on all protocol packets (including those bearing LSAs) are fed directly to both OSPF modules. If both OSPF modules are fed the same information, they should both keep the same pictures of the network.

For each of at least one neighbouring router, each OSPF module maintains a state of the neighbouring router using a state machine corresponding to the neighbouring router. When OSPF protocol packets are received from neighbouring routers, appropriate updates to the state machines are made. For example, when a "Hello" packet from a neighbouring router arrives at an OSPF module, the OSPF module resets a timer. If the timer expires before the arrival of another "Hello" packet, the OSPF module notes that a "Hello" packet is missing and restarts the timer. If a provisioned number of consecutive "Hello" packets are notes as missing, the OSPF module updates the state of the neighbouring router to indicate that the neighbouring router is unreachable, and begins attempting to re-establish contact with the neighbouring router. However, since the active OSPF module and the inactive OSPF module may receive a "Hello" packet at different times, the state of the neighbouring router in the respective state machines may be different. If an RRI arrives while the state machines are different, different shortest paths may be calculated by each OSPF module since an OSPF module does not calculate a path through a neighbouring router suspected of being unreachable.

In order to avoid this, according to a preferred embodiment the inactive OSPF module ignores the timer. While the active OSPF module runs its state machine as a function of the protocol packets, the inactive OSPF module runs its state machine as a function of the protocol packets and instructions received from the active OSPF module. If the active OSPF module implements a particular state transition of its state machine signifying that communication through the neighbouring router is not possible, such as out of "Full" in OSPF systems, the active OSPF sends a notification of the particular state transition to the inactive OSPF module. In running its state machine, the inactive OSPF module only implements a state transition corresponding to one of the particular state transitions upon receipt of the notification of the particular state transition.

Calculation of a route by the OSPF module may be very processing intensive, particularly if the communication network is large or if the calculation has additional constraints such as link and node diversity among different parallel paths. After a failure in a network occurs it may be necessary to recompute thousands of routes in as short a time as possible. The ability to use this inactive OSPF module greatly speeds up the process.

As stated above, the router may have more than one inactive OSPF module. Although this increases hardware costs, additional inactive OSPF modules improves redundancy and load sharing. This is particularly advantageous in the case of routers employing the OSFP protocol, as additional OSPF modules provide additional processing power for calculating shortest paths. Each inactive OSPF module maintains its own link state database and set of state machines (one for each neighbouring router). When the active OSPF module receives an RRI, the active OSPF module selects a selected inactive OSPF module to which it will attempt to send the RRI, as described above with respect to the more general case of a redundancy system having more than one ICC. The active OSPF module establishes and maintains synchronicity of the link state database with each inactive OSPF module. When a state transition occurs in a neighbouring router corresponding to one of the particular state transitions signifying that communication through the neighbouring router is not possible, the active OSPF module sends a notification of the particular state transition to each inactive OSPF module. Each inactive OSPF module only implements a state transition corresponding to one of the particular state transitions upon receipt of a notification of the particular state transition.

The request managers and redundancy managers of the ACC and the ICC may be processors including instructions for carrying out the redundancy methods described above. These instructions may be in the form of any combination of circuitry (including integrated circuitry) or external logical instructions (including software). Each request manager and each redundancy manager may be on a discrete processor, on multiple processors, or on a processor containing other functionality.

What has been described is merely illustrative of the application of the principles of the invention. Other arrangements and methods can be implemented by those skilled in the art without departing from the spirit and scope of the present invention.

We claim:

1. A redundancy method of managing requests in a control plane of a communication node, the communication node including a first control card and a second control card, the redundancy method comprising:

defining one of the control cards to be in an active state and the other of the control cards to be in an inactive state, the control card in the inactive state having a reduced set of privileges compared to the control card in the active state;

maintaining synchronicity of information stored on the control card in the active state and the control card in the inactive state such that the control card in the inactive state can assume responsibilities of the control card in the active state in case of failure of the control card in the active state;

monitoring for failure of the control card in the active state, and upon determining that a failure of the control card in the active state has occurred switching states of the control card in the inactive state and the control card in the active state such that the control card in the inactive state has the active state and the control card in the active state has the inactive state;

receiving or generating a request at the control card in the active state;

determining whether the request is to be passed to the control card in the inactive state; and if the request is to be passed to the control card in the inactive state, passing the request to the control card in the inactive state.

2. The redundancy method of claim 1 wherein switching states of the control card in the inactive state and the control card in the active state comprises:

resetting the control card in the active state; and sending a signal to the control card in the inactive state indicating that the control card in the inactive state is to assume responsibilities of the control card in the active state.

3. The redundancy method of claim 1 wherein monitoring for a failure of the control card in the active state comprises monitoring a reliability measure of each control card, and determining that a failure of the control card in the active state has occurred if the reliability measure of the control card in the active state relative to that of the control card in the inactive state indicates that the control card in the active state is less reliable than the control card in the inactive state.

4. The redundancy method of claim 3 wherein monitoring a reliability measure of each control card comprises:

maintaining a demerit count for each control card indicating how many of at least one monitored component of the control card are in an unreliable state;

if the demerit count of the control card in the active state lies above the demerit count of the control card in the inactive state, determining that a failure of the control card in the active state has occurred.

5. The redundancy method of claim 1 wherein determining whether the request is to be passed to the control card in the inactive state comprises:

determining whether the control card in the inactive state is synchronized with the control card in the active state;

determining if the request has a type which is designated to be processable by the control card in the inactive state;

determining the request is to be passed to the control card in the inactive state if the control card in the inactive state is synchronized with the control card in the active state and the request has a type which is designated to be processable by the control card in the inactive state.

6. The redundancy method of claim 5 wherein the control card in the inactive state includes at least one request provider, and wherein passing the request to the control card in the inactive state comprises:

selecting a selected request provider at the control card in the inactive state; and passing the request to the selected request provider.

7. The redundancy method of claim 1 further comprising:

receiving a request at the control card in the inactive state;

determining whether the request is one which is allowed to be processed on the control card in the inactive state;

if the request is one which is allowed to be processed on the control card in the inactive state, passing the request to a request provider on the control card in the inactive state.

8. The redundancy method of claim 7 further comprising:

if the request is one which is not allowed to be processed on the control card in the inactive state, determining whether the request is to be passed to the control card in the active state by determining whether the control card in the inactive state is synchronized with the control card in the active state and determining whether active handoff of the request is allowed; and if active handoff of the request is allowed and the control cards are synchronized, passing the request received at the inactive card to a request provider on the control card in the active state.

9. The redundancy method of claim 8 further comprising rejecting the request if the control card in the inactive state is not synchronized with the control card in the active state, the request can not be processed by the control card in the inactive state, and if active handoff of the request is not allowed.

10. The redundancy method of claim 1 wherein the communication node is a router running link state routing protocols, wherein the control card in the active state and the control card in the inactive state each include a respective link state database, and wherein maintaining synchronicity comprises:

upon activation of the router, copying the link state database of the control card in the active state to the link state database of the control card in the inactive state as a series of atomic information units; and upon receipt of a new atomic information unit by the control card in the active state, sending a copy of the new atomic information unit to the control card in the inactive state.

11. The redundancy method of claim 10 wherein the atomic information units are Link State Advertisements.

12. The redundancy method of claim 10 wherein the control card in the active state and the control card in the inactive state each maintain a state machine for each of at least one neighbouring router, the method further comprising:

receiving protocol packets from the at least one neighbouring router;

passing the protocol packets to both the control card in the active state and the control card in the inactive state;

the control card in the active state running its state machine as a function of the protocol packets;

the control card in the active state sending instructions to the control card in the inactive state; and the control card in the inactive state running its state machine as a function of the protocol packets and the instructions received from the control card in the active state.

13. The redundancy method of claim 12 wherein the control card in the active state sending instructions to the control card in the inactive state comprises:

upon occurrence of a particular state transition of the control card in the active state's state machine the control card in the active state sending a notification of the particular state transition to the control card in the inactive state;

wherein the control card in the inactive state running its state machine comprises:

the control card in the inactive state running its state machine as a function of the protocol packets excepting that any state transition of the control card in the inactive state's state machine corresponding to one of the particular state transitions of the control card in the active state's state machine is only implemented upon receipt of the notification of the particular state transition.

14. The redundancy method of claim 13 wherein the protocol packets are Open Shortest Path First (OSPF) protocol packets.

15. The redundancy method of claim 14 wherein the particular state transition is any transition out of "Full".

16. A redundancy system for use in a communication node, the redundancy system comprising:

a first control card and a second control card defined so that when one of the control cards is in an active state, the other of the control card is in an inactive state; the control card in the inactive state having a reduced set of priviledges compared to the control card in the active state;

a first redundancy manager on the first control card and a second redundancy manager on the second control card for maintaining synchronicity of information stored on the first control card and the second control card such that the control card in the inactive state can assume responsibilities of the control card in the active state in case of failure of the control card in the active state;

a respective request manager on each of the first and second control cards, the request manager on the control card in the active state being adapted to receive requests and to pass some requests to the control card in the inactive state;

the redundancy system being further adapted to monitor for a failure of the control card in the active state, and for, upon occurrence of such a failure, resetting the control card in the active state and sending a signal to the control card in the inactive state indicating that the control card in the inactive state is to assume the active state.

17. The redundancy system of claim 16 wherein each control card includes at least one monitored component being in either a reliable state or an unreliable state, and the system further comprising means for, upon a change of state of a monitored component:

determining a demerit count for each control card, being an indication of how many monitored components are in the unreliable state; and if the demerit count of the control card in the active state lies above the demerit count of the control card in the inactive state, determining that a failure of the control card in the active state has occurred.

18. The redundancy system of claim 16 wherein the request manager on the active control card comprises means for, upon receipt of a request:

determining whether the control card in the inactive state is synchronized with the control card in the active state and the request can be processed by the control card in the inactive state; and passing the request to the control card in the inactive state for processing in the event that the control card in the inactive state is synchronized with the control card in the active state and the request can be processed by the control card in the inactive state.

19. The redundancy system of claim 18 further comprising a plurality of request providers at the control card in the inactive state, and wherein the means for passing the request to the control card in the inactive state comprise means for:

selecting a selected request provider located at the control card in the inactive state; and sending the request to the selected request provider.

20. The redundancy system of claim 16 wherein the communication node is a router running link state routing protocols, wherein the first control card and the second control card each include a respective link state database, wherein the redundancy manager of the control card in the active state comprises means for:

upon activation of the router, copying the link state database of the control card in the active state to the link state database of the control card in the inactive state as a series of atomic information units; and upon receipt of a new atomic information unit by the control card in the active state, sending a copy of the new atomic information unit to the control card in the inactive state;

wherein the redundancy manager of the control card in the inactive state comprises means for:

upon activation of the router, receiving the series of atomic information units; and building the link state database of the control card in the inactive state from the series of atomic information units.

21. The redundancy system of claim 20 wherein the atomic information units are Link State Advertisements.

22. The redundancy system of claim 20 wherein the first control card and the second control card each maintain a state machine for each of at least one neighbouring router, wherein the control card in the active state comprises means for:

receiving protocol packets originating from the at least one neighbouring router;

running its state machine as a function of the protocol packets; and sending instructions related to the state machine to the control card in the inactive state;

wherein the control card in the inactive state comprises means for:

receiving protocol packets originating from the at least one neighbouring router;

receiving instructions related to the state machine from the control card in the active state; and running its state machine as a function of the protocol packets and the instructions received from the control card in the active state.

23. The redundancy system of claim 22 wherein the means for sending instructions to the control card in the inactive state comprise means for:

upon occurrence of a particular state transition of the state machine of the control card in the active state sending a notification of the particular state transition to the control card in the inactive state;

wherein the means for the control card in the inactive state running its state machine comprise means for:

running the state machine of the control card in the inactive state as a function of the protocol packet excepting that any state transition of the state machine of the control card in the inactive state corresponding to one of the particular state transitions of the state machine of the control card in the active state is only implemented upon receipt of the notification of the particular state transition.

24. The redundancy system of claim 23 wherein the protocol packets are Open Shortest Path First (OSPF) protocol packets.

25. The redundancy system of claim 24 wherein the particular state transition is any transition out of "Full".

26. The redundancy system of claim 16 wherein the request manager of the control card in the inactive state is adapted to receive requests and to pass some requests to the control card in the active state.

27. The redundancy system of claim 26 wherein the request manager of the control card in the inactive state comprises means for, upon receipt of a request:

determining whether the control card in the inactive state is synchronized with the control card in the active state and the request can be processed by the control card in the inactive state;

determining whether active handoff of the request is allowed;

passing the request to the control card in the active state in the event that the control card in the inactive state is not synchronized with the control card in the active state or the request can not be processed by the control card in the inactive state, and active handoff of the request is allowed; and rejecting the request in the event that the control card in the inactive state is not synchronized with the control card in the active state or the request can not be processed by the control card in the inactive state, and active handoff of the request is not allowed.

28. The redundancy system of claim 27 further comprising a plurality of request providers at the control card in the active state, and wherein the means for passing the request to the control card in the active state comprise means for:

selecting a selected request provider located at the control card in the inactive state; and passing the request to the selected request provider.

* * * * *